United States Patent
Jung et al.

(10) Patent No.: US 11,743,859 B2
(45) Date of Patent: Aug. 29, 2023

(54) METHOD AND APPARATUS FOR TRANSMITTING AND RECEIVING PAGING MESSAGE IN NEXT GENERATION MOBILE COMMUNICATION SYSTEM

(71) Applicant: Samsung Electronics Co., Ltd., Suwon-si (KR)

(72) Inventors: Sangyeob Jung, Suwon-si (KR); Sangbum Kim, Suwon-si (KR); Soenghun Kim, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 17/156,396

(22) Filed: Jan. 22, 2021

(65) Prior Publication Data

US 2021/0144673 A1 May 13, 2021

Related U.S. Application Data

(63) Continuation of application No. 16/368,770, filed on Mar. 28, 2019, now Pat. No. 10,904,857.

(30) Foreign Application Priority Data

Mar. 28, 2018 (KR) ........................ 10-2018-0035795

(51) Int. Cl.
*H04W 68/00* (2009.01)
*H04W 76/28* (2018.01)
(Continued)

(52) U.S. Cl.
CPC .......... *H04W 68/005* (2013.01); *H04W 8/08* (2013.01); *H04W 8/26* (2013.01); *H04W 24/08* (2013.01);
(Continued)

(58) Field of Classification Search
CPC ....... H04W 68/005; H04W 8/08; H04W 8/26; H04W 24/08; H04W 72/0446;
(Continued)

(56) References Cited

U.S. PATENT DOCUMENTS

| 8,126,483 B2 * | 2/2012 | Lee ........................ H04W 68/00 455/458 |
| 10,321,431 B2 | 6/2019 | Byun et al. |

(Continued)

FOREIGN PATENT DOCUMENTS

| CN | 101755475 A | 6/2010 |
| CN | 101860961 A | 10/2010 |

(Continued)

OTHER PUBLICATIONS

European Patent Office, "Communication pursuant to Article 94(3) EPC" dated Mar. 23, 2022, in connection with European Patent Application No. 19777834.3, 9 pages.

(Continued)

*Primary Examiner* — Ayanah S George

(57) ABSTRACT

The disclosure relates to a communication method and system for converging a $5^{th}$ generation (5G) communication system for supporting a data rate higher than that of a $4^{th}$ generation (4G) system with an internet of things (IoT) technology. The disclosure is applicable to intelligent services (e.g., smart home, smart building, smart city, smart car or connected car, health care, digital education, retail, and security and safety-related services) based on the 5G communication technology and the IoT-related technology. The disclosure relates to a method and apparatus for transmitting or receiving a frequency-division-multiplexed paging message in a next generation mobile communication system.

24 Claims, 12 Drawing Sheets

(51) Int. Cl.
| | |
|---|---|
| *H04W 72/0446* | (2023.01) |
| *H04W 24/08* | (2009.01) |
| *H04W 8/08* | (2009.01) |
| *H04W 88/02* | (2009.01) |
| *H04W 88/10* | (2009.01) |
| *H04W 72/044* | (2023.01) |
| *H04W 8/26* | (2009.01) |

(52) U.S. Cl.
CPC ..... *H04W 72/046* (2013.01); *H04W 72/0446* (2013.01); *H04W 76/28* (2018.02); *H04W 88/021* (2013.01); *H04W 88/10* (2013.01)

(58) Field of Classification Search
CPC . H04W 72/046; H04W 76/28; H04W 88/021; H04W 88/10; H04W 8/18; H04W 48/12; H04W 68/02; H04W 72/23; H04B 7/2621
See application file for complete search history.

(56) References Cited

U.S. PATENT DOCUMENTS

| | | | |
|---|---|---|---|
| 10,383,118 B2 | 8/2019 | Kim et al. | |
| 2010/0279715 A1 | 11/2010 | Alanara | |
| 2013/0114483 A1* | 5/2013 | Suzuki | H04W 68/02 |
| | | | 370/328 |
| 2013/0303203 A1 | 11/2013 | Wang | |
| 2016/0029434 A1 | 1/2016 | Qiu | |
| 2016/0205660 A1 | 7/2016 | Ryu | |
| 2017/0019878 A1* | 1/2017 | Hu | H04W 76/10 |
| 2017/0347335 A1 | 11/2017 | Yi | |
| 2017/0367069 A1 | 12/2017 | Agiwal et al. | |
| 2018/0014249 A1 | 1/2018 | Nagasaka | |
| 2018/0248675 A1* | 8/2018 | Bhattad | H04L 5/0007 |
| 2019/0223145 A1 | 7/2019 | Jung et al. | |
| 2019/0223149 A1* | 7/2019 | Tseng | H04W 72/23 |

FOREIGN PATENT DOCUMENTS

| | | |
|---|---|---|
| CN | 102340744 A | 2/2012 |
| CN | 104813722 A | 7/2015 |
| CN | 104995967 A | 10/2015 |
| CN | 105309019 A | 2/2016 |
| CN | 106658602 A | 5/2017 |
| CN | 107079250 A | 8/2017 |
| CN | 107211392 A | 9/2017 |
| EP | 2194748 A1 | 9/2010 |
| KR | 10-2018-0108388 A | 10/2018 |
| WO | 2016/007847 A2 | 1/2016 |
| WO | 2017/023150 A1 | 2/2017 |
| WO | 2017/078323 A1 | 5/2017 |

OTHER PUBLICATIONS

VIVO: "Paging in NR", R2-1802108 (Revision of R2-1800886), 3GPP TSG-RAN WG2 Meeting #101, Athens, Greece, Feb. 26-Mar. 2, 2018, 4 pages.
Supplementary European Search Report dated Mar. 18, 2021 in connection with European Patent Application No. 19 77 7834, 8 pages.
Catt, "Issues on Paging Occasion Design", 3GPP TSG-RAN WG2 Meeting #101, Feb. 26-Mar. 2, 2018, 5 pages, R2-1801837.
International Search Report dated Jul. 4, 2019 in connection with International Patent Application No. PCT/KR2019/003680, 3 pages.
Written Opinion of the International Searching Authority dated Jul. 4, 2019 in connection with International Patent Application No. PCT/KR2019/003680, 5 pages.
European Patent Office, "Communication Pursuant to Article 94(3) EPC," dated Sep. 16, 2022, in connection with European Patent Application No. 19777834.3, 7 pages.
China National Intellectual Property Administration, "The First Office Action," dated Feb. 11, 2023, in connection with Chinese Patent Application No. 201980022128.9, 20 pages.
Yingying Xu, "Research on Scheduling Algorithms in Uplink of LTE System," China"s excellent master"s thesis series, Mar. 1, 2013, 82 pages.
Ahmad Awada et al., "A Radio Resource-Efficient Paging Method in High Frequency 5G Networks," 2017 IEEE Globecom Workshops (GC Workshops), Dec. 8, 2017, 6 pages.
Catt, "Remaining issues on CSI-RS," 3GPP TSG RAN WG1 Meeting #69, R1-122042, Prague, Czech Republic, May 21-25, 2012, 3 pages.

* cited by examiner

FIG. 2B

| | T = 256, nB≥T | T = 256, nB=T/2 | T = 256, nB=T/4 | T = 256, nB=T/16 | T = 256, nB=T/256 |
|---|---|---|---|---|---|
| 257 | 257 | 257 | 257 | 257 |
| 256 | 256 | 256 | 256 | 256 |
| 255 | 255 | 255 | ⋮ | 255 |
| 254 | 254 | 254 | 240 | 254 |
| 253 | 253 | 253 | ⋮ | 253 |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| 4 | 4 | 4 | 32 | 4 |
| 3 | 3 | 3 | ⋮ | 3 |
| 2 | 2 | 2 | 16 | 2 |
| 1 | 1 | 1 | ⋮ | 1 |
| 0 | 0 | 0 | 0 | 0 |

METHOD AND APPARATUS FOR TRANSMITTING AND RECEIVING PAGING MESSAGE IN NEXT GENERATION MOBILE COMMUNICATION SYSTEM

CROSS-REFERENCE TO RELATED APPLICATIONS

This application is a continuation of application Ser. No. 16/368,770, filed Mar. 28, 2019, which is based on and claims priority under 35 U.S.C. § 119 to Korean Patent Application No. 10-2018-0035795 filed on Mar. 28, 2018, in the Korean Intellectual Property Office, the disclosures of which are incorporated by reference herein in their entirety

BACKGROUND

1. Field

The disclosure relates to a method and apparatus for transmitting and receiving a paging message in a next generation mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 gigahertz (GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

The disclosure provides an apparatus and method for transmitting and receiving a paging message in a next generation mobile communication system.

In accordance with an embodiment of the present disclosure, there may be provided a method of a terminal, including receiving, from a base station, information for a paging frame offset, determining a paging frame based on the information for the paging frame offset, determining an index indicating a start of the paging occasion based on a number of paging occasions included in the paging frame, and monitoring the paging occasion based on the index.

Furthermore, in accordance with an embodiment of the present disclosure, the method of the terminal including determining the paging frame by using a following equation 1, $$(SFN+PF\_offset) \bmod T = (T \operatorname{div} N)*(UE\_ID \bmod N), \quad [\text{equation 1}]$$

wherein SFN is a system frame number, PF_offset is the paging frame offset, T is a cycle of a discontinuous reception (DRX), N is a number of total paging frames in T, and UE_ID is international mobile subscriber identity (IMSI) mod 1024.

Furthermore, in accordance with an embodiment of the present disclosure, at least one of the information for the paging frame offset, information for the cycle of the DRX, or information for the number of the total paging frames is included in a system information block (SIB).

Furthermore, in accordance with an embodiment of the present disclosure, a number of paging time slots for the paging occasion is the same as a number of slots for remaining minimum system information (RMSI).

Furthermore, in accordance with an embodiment of the present disclosure, the method of the terminal including determining the index by using a following equation 2, $$i\_s = \operatorname{floor}(UE\_ID/N) \bmod Ns, \quad [\text{equation 2}]$$

wherein i_s is the index, UE_ID is international mobile subscriber identity (IMSI) mod 1024, N is a number of total paging frames in T, and Ns is the number of the paging occasions included in the paging frame.

Furthermore, in accordance with an embodiment of the present disclosure, information for the number of the paging occasions is included in a SIB.

Furthermore, in accordance with an embodiment of the present disclosure, the Ns is either 1 or 2, and based on the Ns being 2, a first paging occasion is included in a first half frame of the paging frame and a second paging occasion is included in a second half frame of the paging frame.

In accordance with an embodiment of the present disclosure, there may be provided a method of a base station, including transmitting, to a terminal, information for a paging frame offset, and transmitting, to the terminal, a paging signal including the paging occasion, wherein a paging frame is determined based on the information for the paging frame offset, and an index indicating a start of the paging occasion is determined based on a number of paging occasions included in the paging frame.

Furthermore, in accordance with an embodiment of the present disclosure, the paging frame is determined by using a following equation 3, $$(SFN+PF\_offset) \bmod T = (T \text{ div } N)*(UE\_ID \bmod N), \quad \text{[equation 3]}$$

wherein SFN is a system frame number, PF_offset is the paging frame offset, T is a cycle of a discontinuous reception (DRX), N is a number of total paging frames in T, and UE_ID is international mobile subscriber identity (IMSI) mod 1024.

Furthermore, in accordance with an embodiment of the present disclosure, at least one of the information for the paging frame offset, information for the cycle of the DRX, or information for the number of the total paging frames is included in a system information block (SIB).

Furthermore, in accordance with an embodiment of the present disclosure, wherein a number of paging time slots for the paging occasion is the same as a number of slots for remaining minimum system information (RMSI).

Furthermore, in accordance with an embodiment of the present disclosure, wherein the index is determined by using a following equation 4, $$i\_s = \text{floor}(UE\_ID/N) \bmod Ns, \quad \text{[equation 4]}$$

wherein i_s is the index, UE_ID is international mobile subscriber identity (IMSI) mod 1024, N is a number of total paging frames in T, and Ns is the number of the paging occasions included in the paging frame.

Furthermore, in accordance with an embodiment of the present disclosure, information for the number of the paging occasions is included in a SIB.

Furthermore, in accordance with an embodiment of the present disclosure, the Ns is either 1 or 2, and based on the Ns being 2, a first paging occasion is included in a first half frame of the paging frame and a second paging occasion is included in a second half frame of the paging frame.

In accordance with an embodiment of the present disclosure, there may be provided a terminal comprising a transceiver, and a controller coupled with the transceiver and configured to control the transceiver to receive, from a base station, information for a paging frame offset, determine a paging frame based on the information for the paging frame offset, determine an index indicating a start of a paging occasion based on a number of paging occasions included in the paging frame, and monitor the paging occasion based on the index.

In accordance with an embodiment of the present disclosure, the controller is further configured to determine the paging frame by using a following equation 5, $$(SFN+PF\_offset) \bmod T = (T \text{ div } N)*(UE\_ID \bmod N), \quad \text{[equation 5]}$$

wherein SFN is a system frame number, PF_offset is the paging frame offset, T is a cycle of a discontinuous reception (DRX), N is a number of total paging frames in T, and UE_ID is international mobile subscriber identity (IMSI) mod 1024.

In accordance with an embodiment of the present disclosure, at least one of the information for the paging frame offset, information for the cycle of the DRX, or information for the number of the total paging frames is included in a system information block (SIB).

In accordance with an embodiment of the present disclosure, a number of paging time slots for the paging occasion is the same as a number of slots for remaining minimum system information (RMSI).

In accordance with an embodiment of the present disclosure, the controller is further configured to determine the index by using a following equation 6, $$i\_s = \text{floor}(UE\_ID/N) \bmod Ns, \quad \text{equation [6]}$$

wherein i_s is the index, UE_ID is international mobile subscriber identity (IMSI) mod 1024, N is a number of total paging frames in T, and Ns is the number of the paging occasions included in the paging frame.

In accordance with an embodiment of the present disclosure, information for the number of the paging occasions is included in a SIB.

In accordance with an embodiment of the present disclosure, the Ns is either 1 or 2, and based on the Ns being 2, a first paging occasion is included in a first half frame of the paging frame and a second paging occasion is included in a second half frame of the paging frame.

In accordance with an embodiment of the present disclosure, there may be provided a base station comprising a transceiver, and a controller coupled with the transceiver and configured to control the transceiver to transmit, to a terminal, information for a paging frame offset, and control the transceiver to transmit, to the terminal, a paging signal including a paging occasion, wherein a paging frame is determined based on the information for the paging frame offset, and an index indicating a start of the paging occasion is determined based on a number of paging occasions included in the paging frame.

In accordance with an embodiment of the present disclosure, the paging frame is determined by using a following equation 7, $$(SFN+PF\_offset) \bmod T = (T \text{ div } N)*(UE\_ID \bmod N), \quad \text{[equation 7]}$$

wherein SFN is a system frame number, PF_offset is the paging frame offset, T is a cycle of a discontinuous reception (DRX), N is a number of total paging frames in T, and UE_ID is international mobile subscriber identity (IMSI) mod 1024.

In accordance with an embodiment of the present disclosure, at least one of the information for the paging frame offset, information for the cycle of the DRX, or information for the number of the total paging frames is included in a system information block (SIB).

In accordance with an embodiment of the present disclosure, a number of paging time slots for the paging occasion is the same as a number of slots for remaining minimum system information (RMSI).

In accordance with an embodiment of the present disclosure, the index is determined by using a following equation 8, $$i\_s = \text{floor}(UE\_ID/N) \bmod Ns, \quad \text{[equation 8]}$$

wherein i_s is the index, UE_ID is international mobile subscriber identity (IMSI) mod 1024, N is a number of total paging frames in T, and Ns is the number of the paging occasions included in the paging frame.

In accordance with an embodiment of the present disclosure, information for the number of the paging occasions is included in a SIB.

In accordance with an embodiment of the present disclosure, the Ns is either 1 or 2, and based on the Ns being 2, a first paging occasion is included in a first half frame of the paging frame and a second paging occasion is included in a second half frame of the paging frame.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2B shows exemplary PF intervals that are determined according to the value of nB for T=256;

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Detailed descriptions of well-known functions and structures incorporated herein may be omitted to avoid obscuring the subject matter of the disclosure. Exemplary embodiments of the disclosure are described in detail with reference to the accompanying drawings.

The disclosure relates to a method and apparatus for paging a terminal effectively in a beam-based next generation mobile communication system supporting an expended frame structure.

Figure 1:
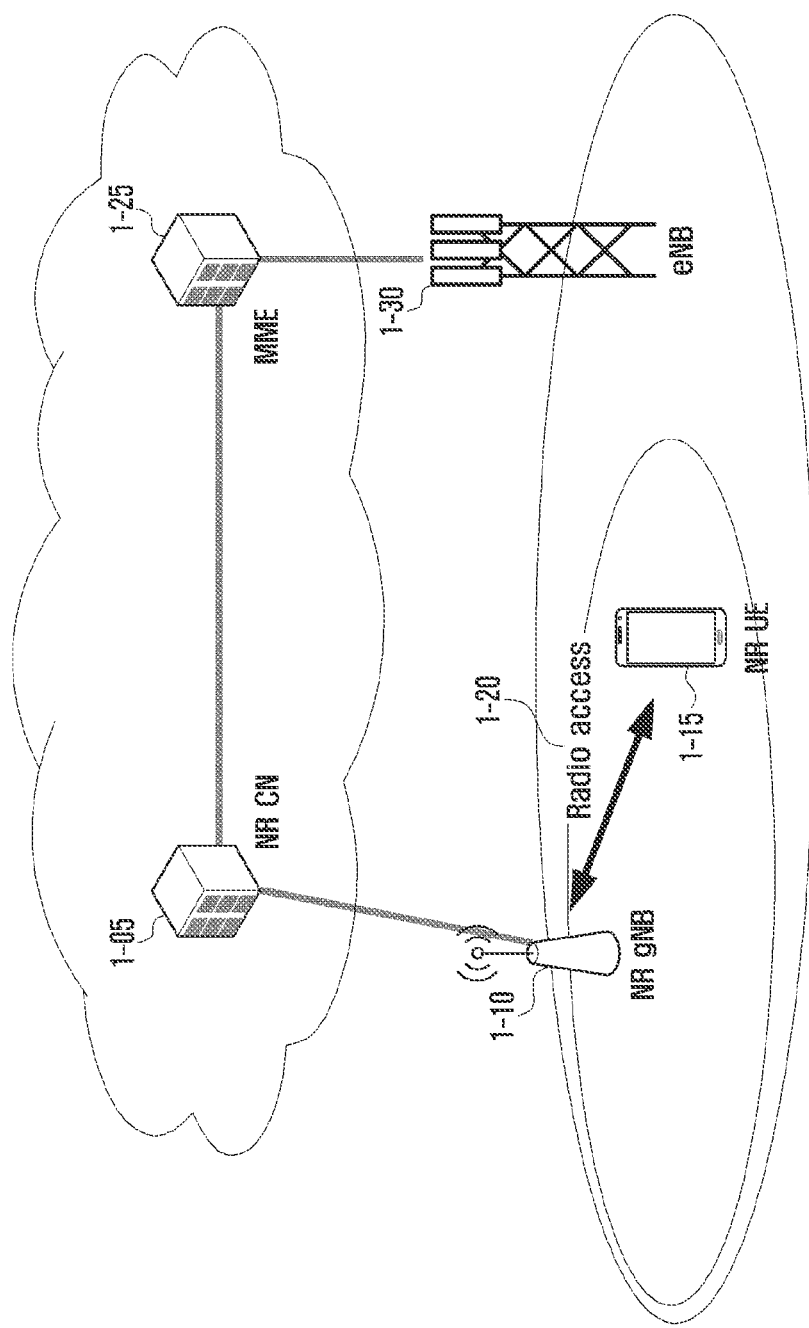
FIG. 1 is a diagram illustrating the architecture of a next generation mobile communication system.

FIG. 1 is a diagram illustrating the architecture of a next generation mobile communication system.

In reference to FIG. 1, a radio access network of the next generation mobile communication system includes a new radio Node B (NR NB) 1-10 and a new radio core network (NR CN) 1-05. A new radio user equipment (hereinafter, referred to as "NR UE" or simply "UE") 1-15 connects to an external network via the NR NB 1-10 and the NR CN 1-05.

In FIG. 1, the NR NB 1-10 corresponds to the evolved Node B (eNB) in the legacy LTE system. The NR UE 1-15 connects to the NR NB, which may provide services superior to those of the legacy eNB. In the next generation mobile communication system where all user traffic is served through shared channels, there is a need of an entity for collecting UE-specific status information (such as buffer status, power headroom status, and channel status) and scheduling the UEs based on the collected information, and the NR NB 1-10 takes charge of such functions. Typically, one NR NB hosts multiple cells. In order to meet the data rate requirement that is higher than that for legacy LTE, it is necessary to secure a maximum bandwidth broader than ever before by employing advanced technologies such as orthogonal frequency division multiplexing (OFDM) as a radio access scheme and beamforming. It may be possible to employ an adoptive modulation and coding (AMC) technology to determine a modulation scheme and a channel coding rate in adaptation to the channel condition of the UE. The NR CN 1-05 is responsible for mobility management, bearer setup, and QoS setup. The NR CN 1-05 is responsible for other control functions as well as UE mobility management functions in connection with a plurality of NR NBs. The next generation mobile communication system may interoperate with legacy LTE systems in such a way of connecting the NR CN 1-05 to a mobility management entity (MME) 1-25 through a network interface. The MME 1-25 is connected to an eNB 1-30 as a legacy LTE base station.

The NR aims to support data rates higher than that of the legacy LTE. In order to increase the data rate in the NR, transmission of signals in an ultra-high frequency band ranging from a few GHz up to 100 GHz, which facilitates securing an ultra-wideband frequency bandwidth, is being considered. Furthermore, securing frequency resources for the next generation mobile communication system through frequency relocation or reassignment in a frequency band ranging from a few hundred MHz to a few GHz in use by the legacy LTE systems is also being considered.

A radio wave in the ultra-high frequency band has a wavelength of a few millimeters and thus is called millimeter wave (mmWave). In the case of using the mmWave (i.e., radio wave in the ultra-high frequency band), the cell coverage is reduced because the pathloss of the radio wave increases in proportion to the frequency band.

As a solution to overcome the shortcomings of the cell coverage reduction caused by use of the ultra-high frequency band, there is a focus on beamforming technology, which increases the propagation distance of radio waves by concentrating the energies of the radio waves emitted by multiple antennas into a target position. The beamforming technology may be applied at both the transmitter and receiver. The beamforming technology gives advantages in reducing interference from outside of the beam direction as well as increasing coverage.

As described above, the operation frequency band of the next generation mobile communication system ranges widely from a few hundred MHz up to 100 GHz. This makes it difficult with a single frame structure to secure proper signal transmission/reception operations in a channel environment with a plurality of frequency bands arranged across the whole ultra-wide frequency band. That is, there is a need to make it possible to transmit and receive signals efficiently using a frame structure configured with subcarrier spacings defined by reflecting operation frequency band-specific characteristics. For example, if a signal is transmitted/received with a subcarrier spacing of 15 kHz that is in use for a legacy LTE system in an mmWave band, it is difficult to overcome a performance degradation caused by a phase noise. That is, in order to overcome the performance degradation caused by the phase noise in an mmWave band, it is preferable to maintain a relatively wide subcarrier spacing. There is therefore a need of employing a scalable frame structure defined to have various subcarrier spacings so as to make it possible to transmit and receive signals efficiently.

Table 1 shows basic scheduling units available in a radio frame according to a subcarrier spacing in an extended frame structure in use by a next generation mobile communication system. As shown in Table 1, the given subcarrier spacing $\Delta f$ determines a number of OFDM symbols per slot $N_{symb}^{slot}$, a slot length $t_{duration}^{slot,\mu}$, a number of slots per subframe $N_{slot}^{subframe,\mu}$, and a number of slots per frame $N_{slot}^{frame,\mu}$. Here, $N_{symb}^{slot}$ is determined according to a length of a cyclic prefix (CP) that is added to each symbol to avoid inter-symbol interference; regardless of the value of $\Delta f$, $N_{symb}^{slot}$ is fixed to 14 for the case of using a normal CP and 12 for the case of using an extended CP regardless of the value of $\Delta f$, the extended CP being applicable only with the subcarrier spacing of 60 kHz.

TABLE 1

| $\mu$ | $\Delta f = 2^\mu \cdot 15$ [kHz] | Cyclic prefix (CP) | $N_{symb}^{slot}$ | $t_{duration}^{slot,\mu}$ | $N_{slot}^{frame,\mu}$ | $N_{slot}^{subframe,\mu}$ |
|---|---|---|---|---|---|---|
| 0 | 15 | Normal | 14 | 1 ms | 10 | 1 |
| 1 | 30 | Normal | 14 | 0.5 ms | 20 | 2 |
| 2 | 60 | Normal, Extended | 14, 12 | 0.25 ms | 40 | 4 |
| 3 | 120 | Normal | 14 | 0.125 ms | 80 | 8 |
| 4 | 240 | Normal | 14 | 0.0625 ms | 160 | 16 |

Hereinafter, descriptions are made of the paging timing in the legacy LTE system and the method for paging a UE effectively in a beam-based next generation mobile communication system supporting an extended frame structure with reference to the accompanying drawings.

Figure 2A:
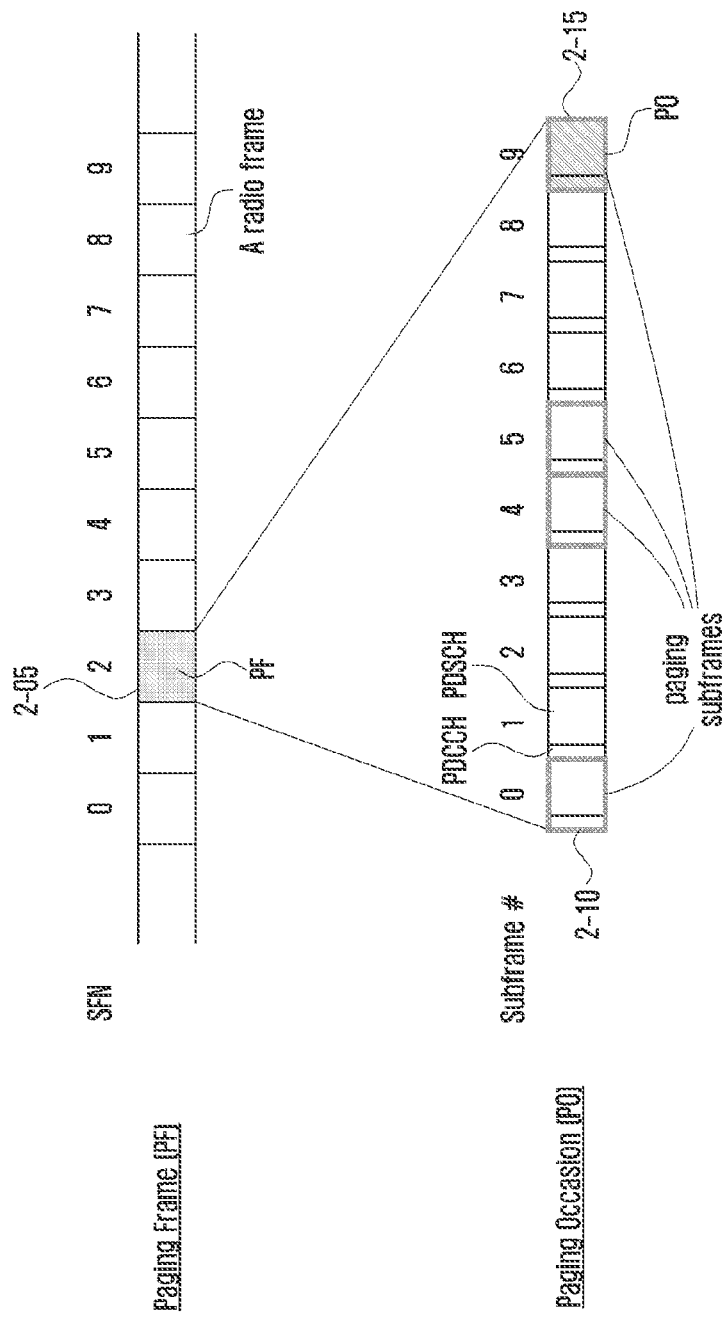
FIG. 2A is a conceptual diagram illustrating the paging timing in the legacy LTE.

FIG. 2A is a conceptual diagram illustrating the paging timing in the legacy LTE.

LTE adopts discontinuous reception (DRX) to enable a UE to save power. In an idle mode, DRX is performed to monitor for a paging signal periodically rather than always. A UE performs a reception operation to receive the paging signal from a base station. Because the paging signal is not transmitted so frequently, if the UE performs the reception operation even when no paging signal is transmitted, this increases unnecessary power consumption. In order to reduce the unnecessary power consumption, a method is devised, which is called DRX, to perform the reception operation during a predetermined time period at a predetermined interval. In the legacy LTE system, the UEs in the idle state perform the DRX operation based on the use of Equation 1. A system frame number (SFN) increases by 1 for every radio frame. If the paging signal is received in the radio frame satisfying Equation 1, the UE performs the reception operation according to the DRX configuration. This radio frame is referred to as a paging frame (PF) 2-05.

$$SFN \bmod T = (T \operatorname{div} N)*(UE\_ID \bmod N) \qquad <\text{Equation 1}>$$

Here,

SFN: System Frame Number. 10 bits (MSB 8 bits explicit, LBS 2 bits implicit)

T: DRX cycle of the UE. Transmitted on SIB2. ENUMERATED {rf32, rf64, rf128, rf256} nB: Transmitted on SIB2. ENUMERATED {4T, 2T, T, T/2, T/4, T/8, T/16, T/32, T/64, T/128, T/256}.

N: min(T,nB)

Ns: max(1, nB/T)

UE_ID: IMSI mod 1024 (IMSI is a unique number assigned to a UE)

A master information block (MIB) that is carried by a physical broadcast channel (PBCH) includes an SFN of 8 bits. The parameters T and nB are included in system information block type 2 (SIB2) being transmitted by the base station. The value of T may be selected from {rf32, rf64, rf128, rf256} where rf32 corresponds to 32 radio frames. That is, rf32 indicates 320 milliseconds (ms). The value of T that is actually applied to Equation 3 is derived through coordination among the UE, base station, and mobility management entity (MME). The base station provides the UE with a default DRX value via SIB as one of system information blocks it broadcasts. If the UE wants a DRX period shorter than that indicated by the default DRX value, it may transmit a UE-specific DRX value as a desired DRX value to the MME through an ATTACH procedure. If it is necessary to page the UE, the MME transmits to the base station the UE-specific DRX value received from the UE along with a paging message. The UE determines the smallest value between the UE-specific DRX value transmitted to the MME and the default DRX value received from the base station as the DRX period. The base station also determines the smallest value between the UE-specific DRX value received from the MME and the default DRX value it is broadcasting as the DRX period for the UE. The DRX period value is identified with the actual value of T that is applied to Equation 3. Accordingly, the UE and the base station select the same DRX period, and the base station determines the PF based on the DRX period and transmits a paging signal to the UE in the PF.

FIG. 2B shows exemplary PF intervals that are determined according to the value of nB for T=256. In FIG. 2B, the figures given in the columns are SFN values. For example, if nB is equal to or greater than T, the base station transmits a paging signal to the UE at every radio frame (SFN) during the DRX period. Meanwhile, if the nB is less than T, e.g., nB=T/2, the base station transmits the paging signal to the UE at an interval of 2 radio frames (SFN 0, SFN 2, SFN 4, . . . ) during the DRX period. In the case where nB is less than T, the base station transmits the paging signal to the UE at the PFs with even-numbered SFNs.

In the legacy LTE system, the subframes that can be used for paging are fixed in the PF. Such subframes are referred to as paging subframes 2-10. The UE monitors a paging subframe for the paging signal destined for itself in the PF determined based on Equation 3. The paging subframe is referred to as paging occasion (PO) 2-15. The PO is derived through Equation 2.

$$i\_s=\text{floor}(UE\_ID/N) \bmod Ns \quad \text{<Equation 2>}$$

Using the value of i_s calculated by Equation 2, it is possible to retrieve the PO of the UE from Tables 2 and 3.

TABLE 2

| | FDD | | | |
|---|---|---|---|---|
| Ns | PO when i_s = 0 | PO when i_s = 1 | PO when i_s = 2 | PO when i_s = 3 |
| 1 | 9 | N/A | N/A | N/A |
| 2 | 4 | 9 | N/A | N/A |
| 4 | 0 | 4 | 5 | 9 |

TABLE 3

| | TDD (all UL/DL configurations) | | | |
|---|---|---|---|---|
| Ns | PO when i_s = 0 | PO when i_s = 1 | PO when i_s = 2 | PO when i_s = 3 |
| 1 | 0 | N/A | N/A | N/A |
| 2 | 0 | 5 | N/A | N/A |
| 4 | 0 | 1 | 5 | 6 |

Figure 3:
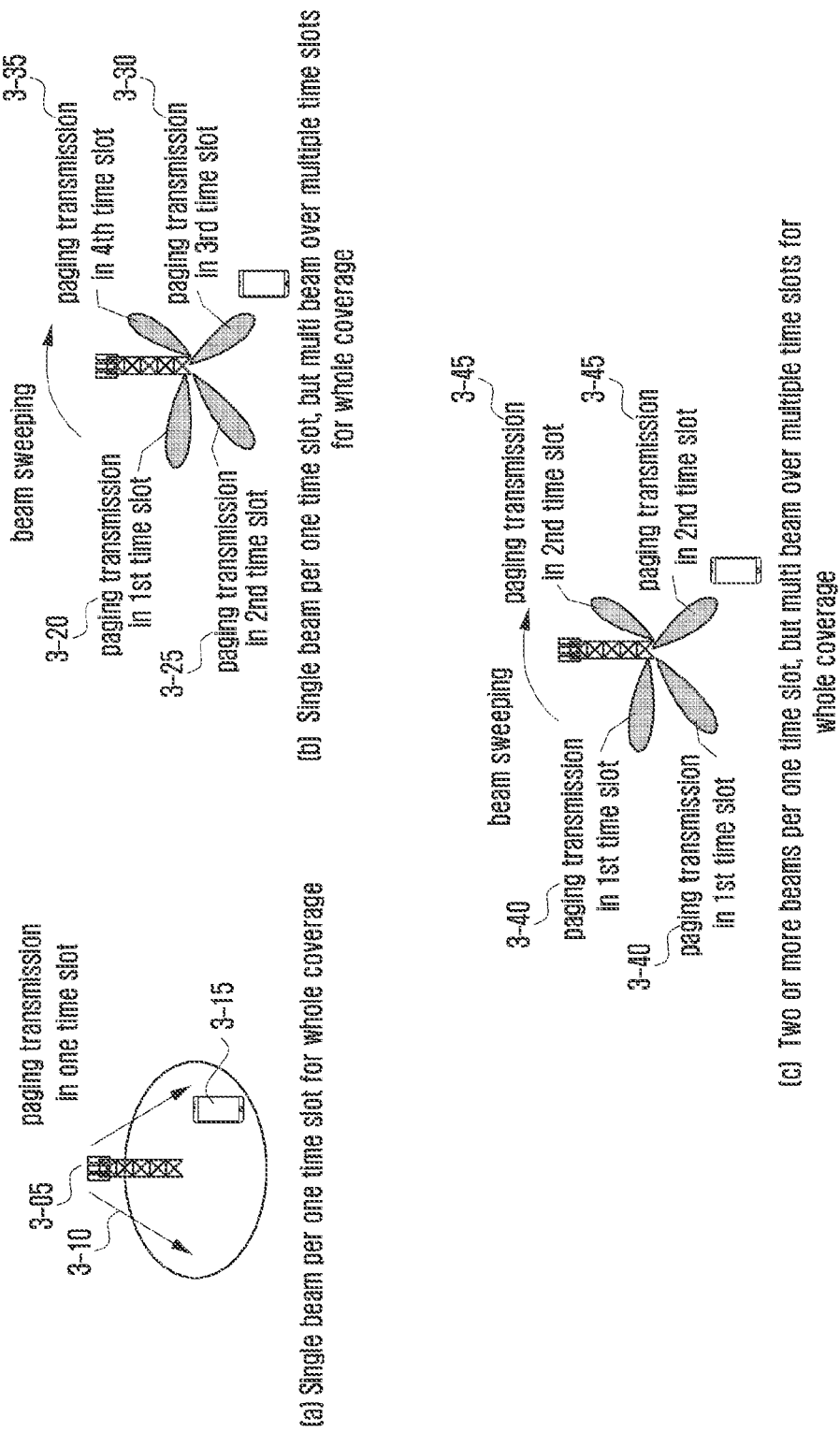
FIG. 3 is a diagram illustrating an operation of paging a UE using multiple time slots according to an embodiment of the disclosure.

FIG. 3 is a diagram illustrating an operation of paging a UE using multiple time slots according to an embodiment of the disclosure. In the next generation mobile communication system, it is possible to use both low and high frequency bands. A below-6 GHz frequency cell forms a service area with an omnidirectional antenna or sector antennas. This is referred to as using single beam antennas in the disclosure. In the case of using a single beam antenna, a signal for paging a UE is broadcast in all directions within the service area; the base station transmits the paging signal only at one time slot as denoted by reference number 3-10. Meanwhile, an above-6 GHz frequency cell uses a beamforming technology to increase a radio wave propagation distance to secure an adequate service area. However, the directional beam-based transmission causes the UE located outside the beam a problem in transmitting/receiving the signal, and beam sweeping is employed to overcome the problem. Beam sweeping is a technique that allows a transmitter to transmit a directional beam with a predetermined beamwidth in all predefined directions in such a way of sweeping or rotating the beam sequentially at a regular interval in order for a receiver located within a beam arrival distance to receive the beam. The beam sweeping technique is useful for transmitting a signal to a UE in the idle mode because the base station cannot be aware of the proper direction of beamforming to the UE, which is difficult to be located in the idle mode. The base station may not be able to use all beam antennas during a signal time slot for the reason of transmit power limitation and inter-antenna interference suppression. Accordingly, in order to deliver a paging signal to the UE, the base station has to perform the beam sweeping in such a way of transmitting the paging signal with one beam antenna per time slot in order as denoted by reference numbers 3-20, 3-25, 3-30, and 3-35 or of transmitting the paging signal with two or more beam antennas per time slot in order as denoted by reference numbers 3-40 and 3-45. The disclosure proposes a method for configuring multiple time slots. It may be possible to identify a time slot with one or more OFDM symbols, a transmission time interval (TTI), and a subframe.

The disclosure is embodied in embodiment 1-1 for the case where a slot is mapped to a beam antenna and embodiment 1-2 for the case where a slot is mapped to two or more beam antennas.

<Embodiment 1-1>

Figure 4:
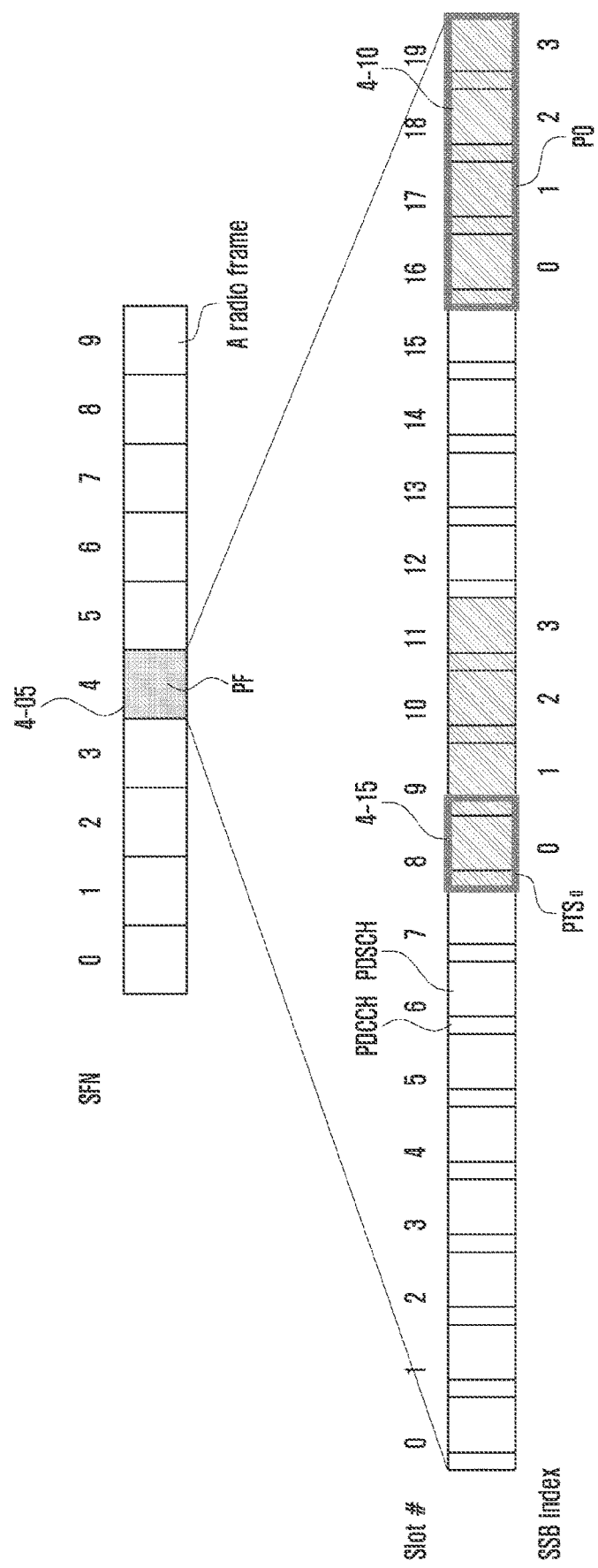
FIG. 4 is a diagram illustrating an operation of paging a UE using a PO composed of multiple time slots in a radio frame according to an embodiment of the disclosure.

FIG. 4 is a diagram illustrating an operation of paging a UE using a PO composed of multiple time slots in a radio frame according to an embodiment of the disclosure. As described above, multiple time slots are required for transmitting a paging signal with multiple beam antennas. Unlike the legacy LTE system using a PO consisting of one time slot, the system according to an embodiment of the disclosure is characterized by using a PO consisting of multiple time slots 4-10. In this embodiment, a time slot corresponds to a beam antenna, which transmits a paging signal only in the corresponding time slot. In this embodiment, the time slot is referred to as a paging time slot (PTS) 4-15. In detail, the PTS denotes a time slot for transmitting a paging signal quasi co-located (QCLed) with a synchronization signal/physical broadcast channel block (SSB). The SSB includes a primary synchronization signal (PSS) and a secondary synchronization signal (SSS) for achieving synchronization between a UE and a base station and a physical broadcast channel (PBCH) for acquiring information broadcast within a cell. The base station may explicitly notify the UE of the multiple time slots constituting a PO. For the case where the base station does not explicitly notify the UE of the multiple time slots constituting a PO, the disclosure proposes a method for indicating the number of PTSs constituting a PO using the highest SSB index. For example, the number of PTSs constituting a PO may be indicated by SSB index+1. In this embodiment, assuming the subcarrier spacing of 30 kHz and the highest SSB index of 3, a PO consists of 4 PTSs as denoted by multiple time slots 4-10. The nth PTS in the PO may be configured as PTSn-1 as denoted, for example by PTS 4-15. Although 4 PTSs are assigned for transmission of a signal paging the UE, it is sufficient for the UE to successfully receive the paging signal in one PTS. If the received signal strength of the paging signal is greater than that of a reference signal in all PTSs, the UE may monitor all of the PTSs or only the PTS(s) corresponding to one or N SSB indices indicating the SSBs with the best received signal strengths for the paging signal. Because the same paging signal is transmitted in all of the PTSs constituting a PO, it may be possible to perform soft combining on the multiple PTSs to decode the paging message.

The disclosure proposes DRX operations of UEs in the idle state using Equation 3 in the next generation mobile communication system. The SFN increases by 1 for every radio frame. If the paging signal is received in the radio frame satisfying Equation 3, the UE performs the reception operation according to the DRX configuration. This radio frame is referred to as paging frame (PF) 4-05.

$$(SFN+\text{offset}) \bmod T = (T \text{ div } N)*(UE\_ID \bmod N) \quad \text{<Equation 3>}$$

Here,

SFN: System Frame Number. 10 bits (MSB 8 bits explicit, LBS 2 bits implicit)

T: DRX cycle of the UE. Transmitted on SIB2. ENUMERATED {rf32, rf64, rf128, rf256}

N: min(T,nB)

nB: Transmitted on SIB2. ENUMERATED {2T, T, T/2, T/4, T/8, T/16}.

offset: 0, 1 for nB=T/2; 0, 1, . . . , 3 for nB=T/4; 0, 1, . . . , 7 for nB=T/8, 0, 1, . . . , 15 for nB=T/16

UE_ID: IMSI mod 1024 (IMSI is a unique number assigned to a UE)

A master information block (MIB) that is carried by a physical broadcast channel (PBCH) includes an SFN of 8 bits. The parameters T and nB are included in system information block type 2 (SIB2) being transmitted by the base station. As described above, the base station transmits a paging signal QCLed with SSBs to the UE. Here, the paging signal being transmitted from the base station to the UE may be frequency-division-multiplexed (FDMed) or time-division-multiplexed (TDMed) with an SS burst set. Because an SS burst set periodicity may be set to a value selected from {5, 10, 20, 40, 80, 160 ms}, the base station transmits the SS burst set to the UE based on the preset periodicity. As a result, the UE may perform a paging signal reception operation according to SS burst set periodicity. Accordingly, the disclosure proposes a method for configuring the value of nB in association with the SS burst set periodicity. Unlike the legacy LTE system in which the nB value is selected from {4T, T, T/2, T/4, T/8, T/16, T/32, T/64, T/128, T/256}, the next generation mobile communication system is characterized by selecting the nB value from {2T, T, T/2, T/4, T/8, T/16}. The disclosure proposes a method for the base station to transmit a paging signal regardless of whether the SFN of the PF is even or odd. As described above, unlike the legacy LTE in which the base station transmits a paging signal to the UE if the SFN of the PF is always even in the case where NB is less than T, the NR is characterized in that the SFN of the PF may be either even or odd because the base station transmits the paging signal QCLed with SSBs to the UE. For example, if the SS burst set periodicity is 40 ms, the base station may select one of 4 radio frames to transmit the SS burst set to the UE such that SFN of the radio frame carrying the SS burst set may be either even or odd. If the base station transmits the paging signal QCLed with the SS burst set to the UE, the UE has to perform the paging signal reception based on the SFN of the PF carrying the SS burst set. Accordingly, the disclosure proposes performing the paging signal reception operation based on the paging signal being transmitted in the radio frame satisfying Equation 3 with the introduction of an offset in the case where nB is less than T. The value of T may be selected from {rf32, rf64, rf128, rf256} where rf32 corresponds to 32 radio frames. That is, rf32 indicates 320 ms. The value of T that is actually applied to Equation 3 is derived through coordination among the UE, base station, and MME. The base station provides the UE with a default DRX value via SIB as one of system information blocks it broadcasts. If the UE wants a DRX period shorter than that indicated by the default DRX value, it may transmit a UE-specific DRX value as a desired DRX value to the MME through an ATTACH procedure. If it is necessary to page the UE, the MME transmits to the base station the UE-specific DRX value received from the UE along with a paging message. The UE determines the smallest value between the UE-specific DRX value transmitted to the MME and the default DRX value received from the base station as the DRX period. The base station also determines the smallest value between the UE-specific DRX value received from the MME and the default DRX value it is broadcasting as the DRX period for the UE. The DRX period value is identified with the actual value of T that is applied to Equation 3. Accordingly, the UE and the base station select the same DRX period. The base station determines the PF using Equation 3 based on the DRX period and transmits a paging signal to the UE in the PF.

The UE monitors a PO in the PF derived by Equation 3 for the paging signal destined therefor as denoted by multiple time slots 4-10. The PO is derived by Equation 4.

$$i\_s = \text{floor}(UE\_ID/N) \bmod Ns \quad \text{<Equation 4>}$$

Here, because the value of nB is selected from {2T, T, T/2, T/4, T/8, T/16}, Ns becomes 2 for the case where nB is 2T and 1 for the case where nB is equal to or less than T. Accordingly, Ns may be set to 1 or 2. Because a PO may consist of multiple PTSs as aforementioned, the terminal should know the start point of the PO, i.e., the first PTS within the PO, to perform monitoring efficiently for the paging signal destined therefor. The number of PTSs constituting a PO is identical with the number of slots/symbols of the remaining minimum system information (RMSI) being transmitted from the base station to the UE. The RMSI is system information including partial information of SIB1 and SIB2 as specified in LTE, and the base station broadcasts the RMSI periodically. The disclosure proposes a method for transmitting a paging signal FDMed with the RMSI to a UE. As described above, the base station may transmit the paging signal FDMed or TDMed with SSBs. In the case where the paging signal is FDMed, the UE may derive the first PTS within the PO derived as above from the start time of the RMSI. In the case where the paging signal is TDMed, if the start time of the RMSI is fixed, the UE may derive the first PTS within the PO derived as above from the start time of the RMSI. In the case where the paging signal is TDMed, if the start time of the RMSI changes dynamically, the base station may notify the UE of the start time of the RMSI. Alternatively, if the base station transmits the paging signal to the UE in a slot different from that carrying the RMSI for flexibility, the base station may notify the UE of the first slot carrying the paging signal within the PO. The disclosure proposes a method for a UE to perform monitoring for a paging signal with Table 4.

TABLE 4

| Ns | The first TS of PO when i_s = 0 | The first TS of PO when i_s = 1 |
|---|---|---|
| 1 | The first TS of RMSI if starting slot is not signaled Starting slot if signaled | N/A |
| 2 | The first TS of the first RMSI Starting slot if signaled | The first TS of the second RMSI Starting slot if signaled |

Figure 5:
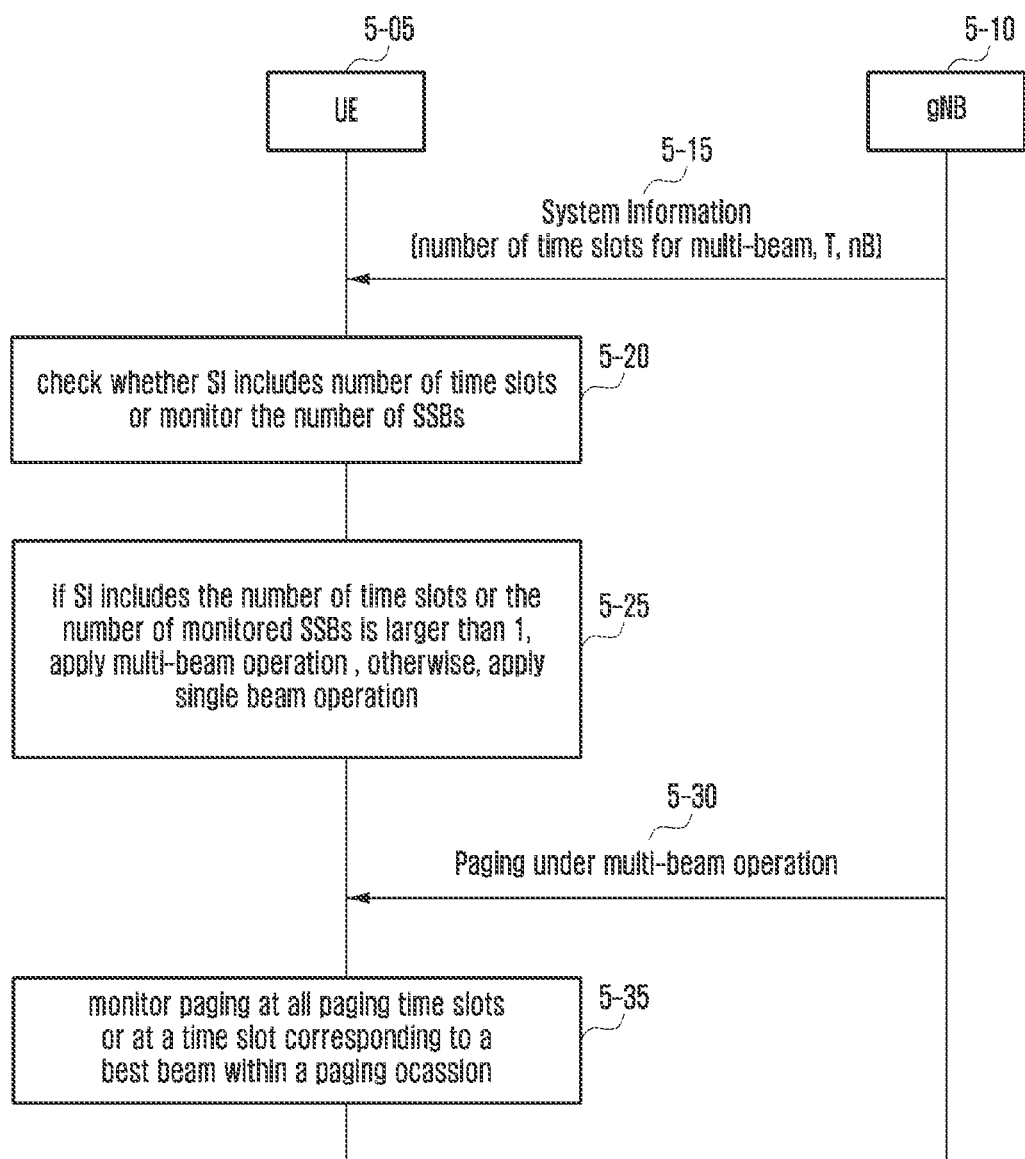
FIG. 5 is a signal flow diagram illustrating a procedure for paging a UE using multiple time slots according to embodiment 101 of the disclosure.

FIG. 5 is a signal flow diagram illustrating a procedure for paging a UE using multiple time slots according to embodiment 101 of the disclosure.

The UE 5-05 receives system information from a base station 5-10 at step 5-15, the system information including a number of time slots corresponding to multi-beam antennas and values of T and nB as paging-related configuration information. Here, the number of time slots corresponding to multi-beam antennas may not be included in the system information. The time slot information is provided in the cell supporting the multi-beam antennas but is not necessary to be provided in the cell supporting single-beam antennas. Accordingly, a cell which provides the above information as a part of the system information may be regarded as a cell supporting multi-beam antennas. The UE acquires the time slot information from the system information to ascertain the number of beam antennas at step 5-20 and prepares, at step 5-25, for receiving a paging signal from multi-beam antennas. If the system information does not include the number of time slots, the UE monitors an SSB to ascertain the number of beam antennas at step 5-20. At step 5-25, the UE prepares for receiving a paging signal from multiple beam antennas based on the number of beam antennas being equal to or greater than 2 or from a single beam antenna based on the number of beam antennas being less than 2. In the case of receiving a paging signal from a signal beam antenna, the paging signal reception operation is identical with that in the legacy LTE system in which the paging signal reception operation is performed at one PO consisting of one slot in one PF. In the case of receiving a paging signal from multi-beam antennas, the paging signal reception operation may vary according to the unit of time slot; in order for the UE to receive the paging signal in one PO consisting of multiple time slots in one PF, the base station transmits the paging signal in each of time slots constituting the PO at step 5-30. However, it may be sufficient for a UE to monitor time slots corresponding to one or N best beams for the paging signal at step 5-35.

Figure 6:
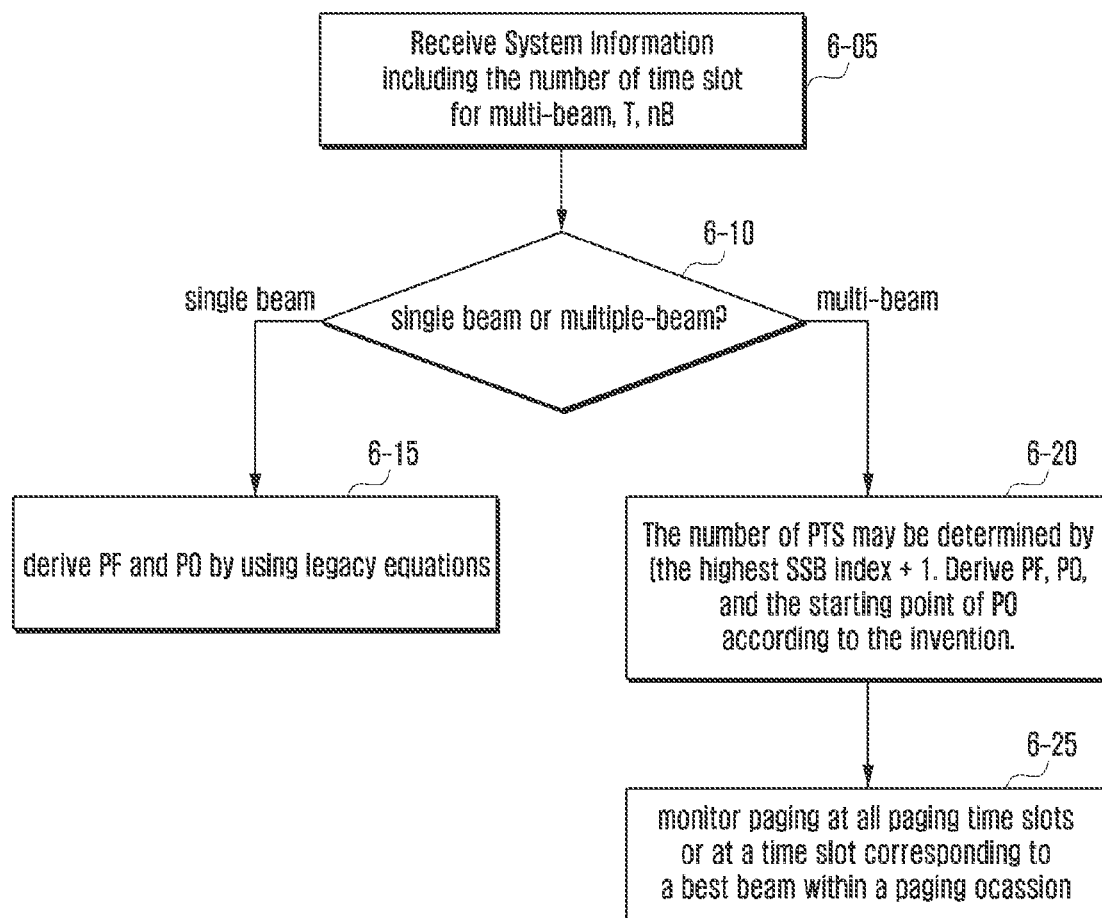
FIG. 6 is a flowchart illustrating a UE operation according to embodiment 1-1 of the disclosure.

FIG. 6 is a flowchart illustrating a UE operation according to embodiment 1-1 of the disclosure.

The UE receives system information from a base station at step 6-05, the system information including a number of time slots corresponding to multi-beam antennas and values of T and nB as paging-related configuration information. At step 6-10, the UE determines to receive a paging signal from multi-beam antennas for the case where the system information includes time slot information and from a single beam antenna for the case where the system information does not include the time slot information. Furthermore, at step 6-10, the UE may monitor an SSB for the number of beam antennas to determine to receive a paging signal from multi-beam antennas for the case where the number of beam antennas is equal to or greater than 2 and from a single beam antenna for the case where the number of beam antennas is less than 2. If the UE determines to receive a paging signal from a single beam antenna, it derives a PF and a PO, at step 6-15, by using the legacy LTE paging formula. If the UE determines to receive a paging signal from multi-beam antennas, it may derive the number of PTSs constituting a PO, at step 6-20, through a formula of highest SSB index+1. After deriving the PF and PO through the paging formula proposed in the disclosure at step 6-20, the UE derives the first PTS in the PO. At step 6-25, the UE monitors the time slots corresponding to one or N best beams for a paging signal.

Figure 7:
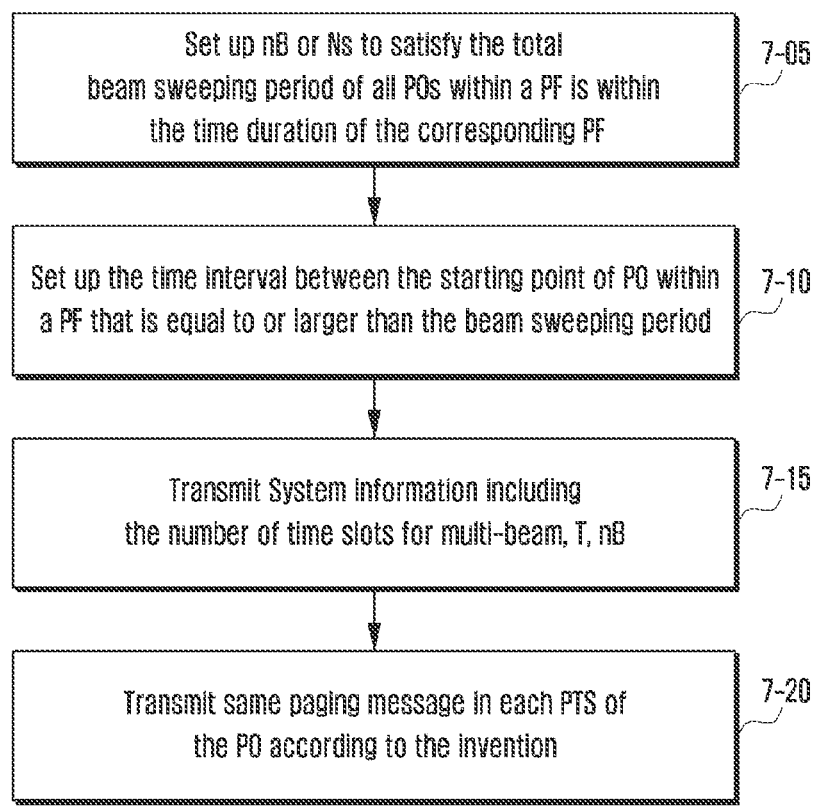
FIG. 7 is a flowchart illustrating a base station operation according to embodiment 1-1 of the disclosure.

FIG. 7 is a flowchart illustrating a base station operation according to embodiment 1-1 of the disclosure.

At step 7-05, the base station sets nB (or Ns) to a value that makes the total beam sweeping period of all POs within a PF shorter than the time duration of the corresponding PF. At step 7-10, the base station sets the PTS start time point interval of the POs within the PF to be equal to or greater than the beam sweeping period. At step 7-15, the base station notifies the UE of the number of time slots corresponding to the multi-beam antennas and values of T and nB corresponding to the paging-related configuration information via system information. At step 7-20, the base station transmits the same paging message at predetermined PTSs according to an embodiment of the disclosure.

Figure 8:
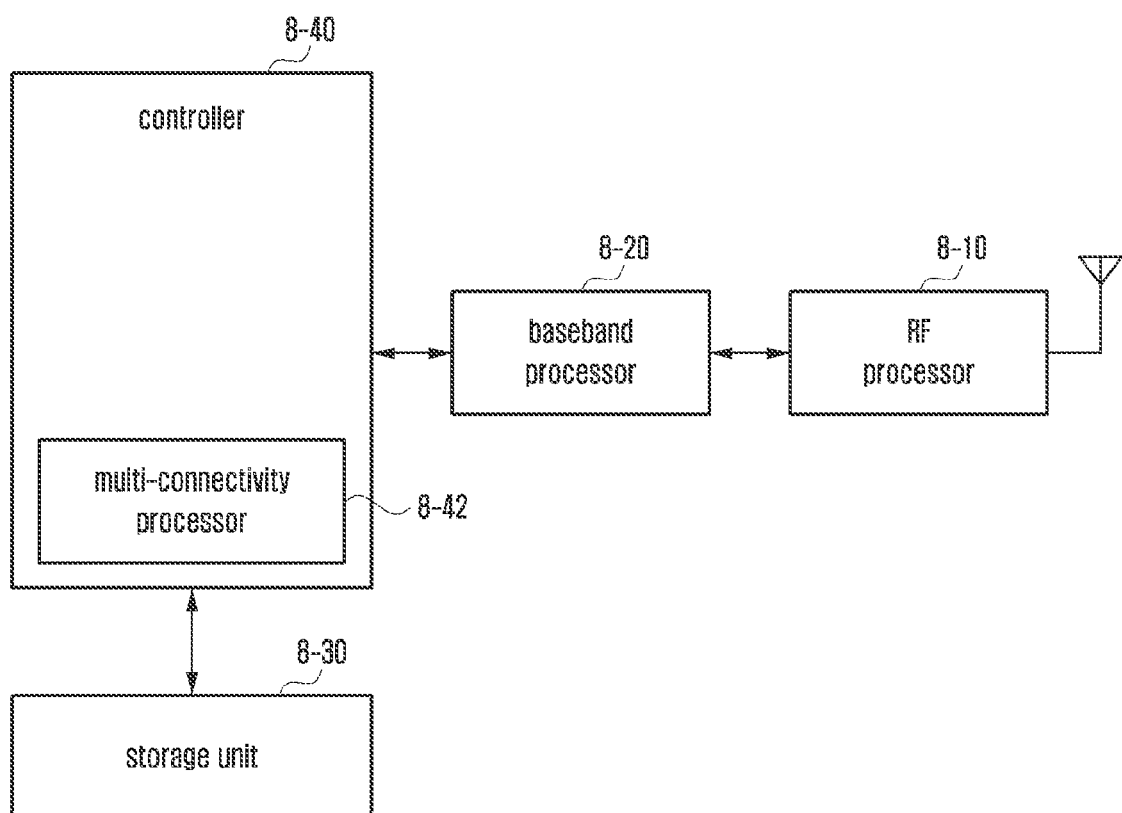
FIG. 8 is a block diagram illustrating a configuration of a UE according to embodiment 1-1 of the present invention.

FIG. 8 is a block diagram illustrating a configuration of a UE according to embodiment 1-1 of the present invention.

In reference to FIG. 8, the UE includes a radio frequency (RF) processor 8-10, a baseband processor 8-20, a storage unit 8-30, and a controller 8-40.

The RF processor 8-10 has a function for transmitting/receiving a signal over a radio channel such as band conversion and amplification of the signal. That is, the RF processor 8-10 up-converts a baseband signal from the baseband processor 8-20 to an RF band signal and transmits the RF signal via an antenna and down-converts the RF signal received via the antenna to a baseband signal. For example, the RF processor 8-10 may include a transmission filter, a reception filter, an amplifier, a mixer, an oscillator, a digital-to-analog converter (DAC), and an analog-to-digital converter (ADC). Although one antenna is depicted in the drawing, the UE may be provided with a plurality of antennas. The RF processor 8-10 may also include a plurality of RF chains. The RF processor 8-10 may perform beamforming. For beamforming, the RF processor 8-10 may adjust the phase and size of a signal to be transmitted/received by means of the antennas or antenna elements. The RF processor 8-10 may be configured to support a MIMO scheme with which the UE can receive multiple layers simultaneously.

The baseband processor 8-20 has a baseband signal-bit string conversion function according to a physical layer standard of the system. For example, in a data transmission mode, the baseband processor 8-20 performs encoding and modulation on the transmission bit string to generate complex symbols. In a data reception mode, the baseband processor 8-20 performs demodulation and decoding on the baseband signal from the RF processor 8-10 to recover the transmitted bit string. In the case of using an OFDM scheme for data transmission, the baseband processor 8-20 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols. In the data reception mode, the baseband processor 8-20 splits the baseband signal from the RF processor 8-10 into OFDM symbols, performs fast Fourier transform (FFT) on the OFDM symbols to recover the signals mapped to the subcarriers, and performs demodulation and decoding on the signals to recover the transmitted bit string.

The baseband processor 8-20 and the RF processor 8-10 process the transmission and reception signals as described above. Accordingly, the baseband processor 8-20 and the RF processor 8-10 may be referred to as a transmitter, a receiver, a transceiver, or a communication unit. At least one of the baseband processor 8-20 and the RF processor 8-10 may include a plurality of communication modules for supporting different radio access technologies. At least one of the baseband processor 8-20 and the RF processor 8-10 may also include multiple communication modules for processing the signals in different frequency bands. For example, the different radio access technologies may include a wireless local area network (WLAN) (e.g., Institute of Electrical and Electronics Engineers (IEEE) 802.11) and a cellular network (e.g., LTE). The different frequency bands may include a super high frequency (SHF) band (e.g., 2.5 GHz and 5 GHz bands) and an mmWave band (e.g., 60 GHz).

The storage unit 8-30 stores data such as basic programs for operation of the UE, application programs, and setting information. The storage unit 8-30 may also store the information on a second access node for radio communication with a second radio access technology. The storage unit 8-30 provides the stored information in response to a request from the controller 8-40.

The controller 8-40 controls overall operations of the UE. For example, the controller 8-40 controls the baseband processor 8-20 and the RF processor 8-10 for transmitting and receiving signals. The controller 8-40 writes and reads data to and from the storage unit 8-30. For this purpose, the controller 8-40 may include at least one processor. For example, the controller 8-40 may include a communication processor (CP) for controlling communications and an application processor (AP) for controlling higher layer programs such as applications.

Figure 9:
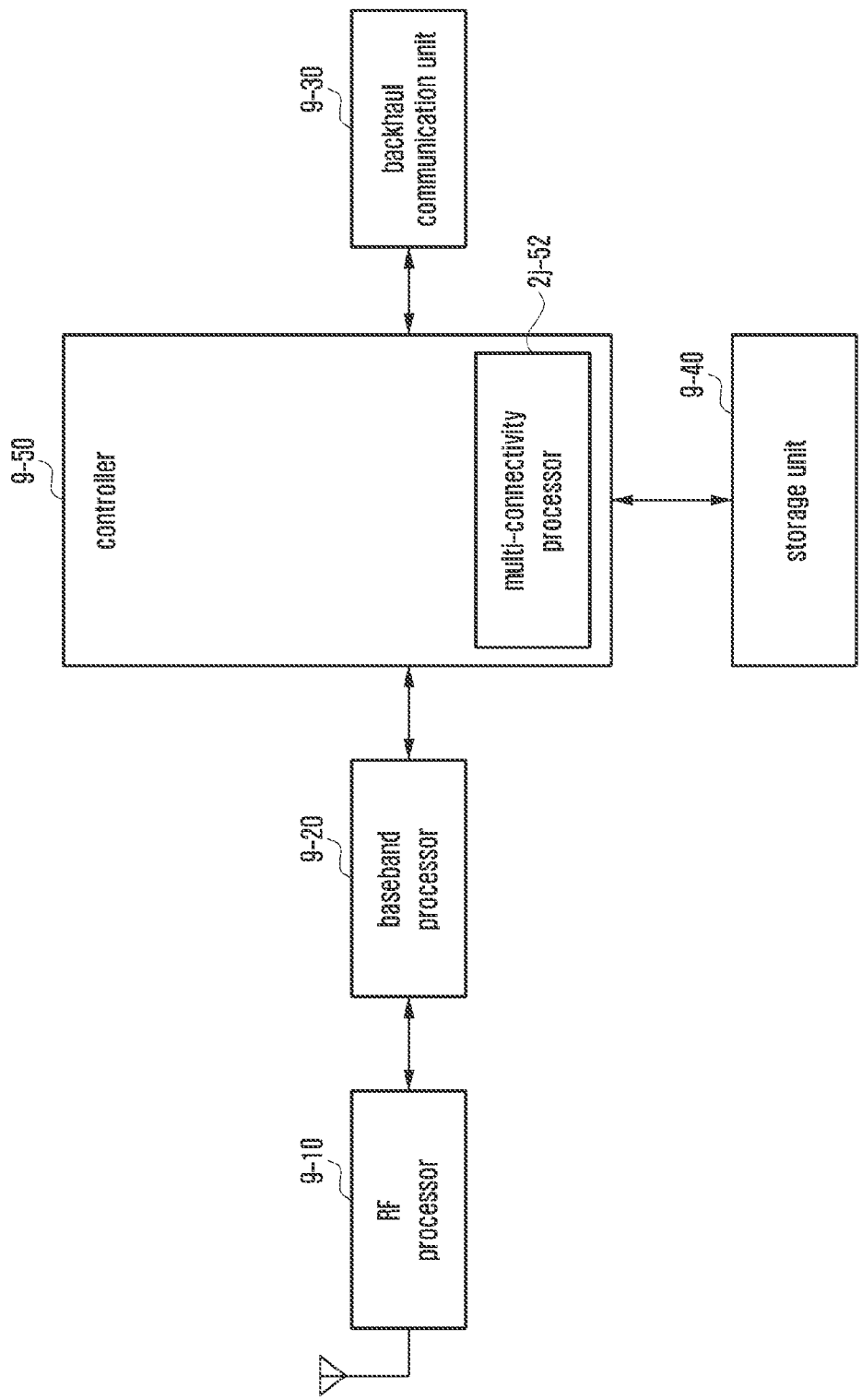
FIG. 9 is a block diagram illustrating a configuration of a base station in a wireless communication system according to embodiment 1-1 of the disclosure.

FIG. 9 is a block diagram illustrating a configuration of a base station in a wireless communication system according to embodiment 1-1 of the disclosure.

As shown in the drawing the base station includes an RF processor 9-10, a baseband processor 9-20, a backhaul communication unit 9-30, a storage unit 9-40, and a controller 9-50.

The RF processor 9-10 has a function for transmitting/receiving a signal over a radio channel such as band conversion and amplification of the signal. That is, the RF processor 9-10 up-converts a baseband signal from the baseband processor 9-20 to an RF band signal and transmits the RF signal via an antenna and down-converts the RF signal received via the antenna to a baseband signal. For example, the RF processor 9-10 may include a transmission filter, a reception filter, an amplifier, a mixer, an oscillator, a DAC, and an ADC. Although one antenna is depicted in the drawing, the base station may be provided with a plurality of antennas. The RF processor 9-10 may also include a plurality of RF chains. The RF processor 1*i*-10 may perform beamforming. For beamforming, the RF processor 9-10 may adjust the phase and size of a signal to be transmitted/received by means of the antennas or antenna elements. The RF processor 9-10 may be configured to transmit one or more layers for a downlink MIMO operation.

The baseband processor 9-20 has a baseband signal-bit string conversion function according to a physical layer standard of the system. For example, in a data transmission mode, the baseband processor 9-20 performs encoding and modulation on the transmission bit string to generate complex symbols. In a data reception mode, the baseband processor 9-20 performs demodulation and decoding on the baseband signal from the RF processor 9-10 to recover the transmitted bit string. In the case of using an OFDM scheme for data transmission, the baseband processor 9-20 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols. In the data reception mode, the baseband processor 9-20 splits the baseband signal from the RF processor 9-10 into OFDM symbols, performs fast Fourier transform (FFT) on the OFDM symbols to recover the signals mapped to the subcarriers, and performs demodulation and decoding on the signals to recover the transmitted bit string. The baseband processor 9-20 and the RF processor 9-10 process the transmission and reception signals as described above. Accordingly, the baseband processor 9-20 and the RF processor 9-10 may be referred to as a transmitter, a receiver, a transceiver, or a communication unit.

The backhaul communication unit 9-30 provides an interface for communication with other nodes in the network. That is, the backhaul communication unit 9-30 converts a bit string to be transmitted from the base station to another node, e.g., another base station and core network, to a physical signal and converts a physical signal received from another node to a bit string.

The storage unit 9-40 stores data such as basic programs for operation of the base station, application programs, and setting information. The storage unit 9-40 may also store the information on the bearers established for UEs and measurement results reported by the connected UEs. The storage unit 9-40 may also store the information for use by a UE in determining whether to enable or disable multi-connectivity. The storage unit 9-40 may provide the stored data in reference to a request from the controller 9-50.

The controller 9-50 controls overall operations of the base station. For example, the controller 9-50 controls the baseband processor 9-20, the RF processor 9-10, and the backhaul communication unit 9-30 for transmitting and receiving signals. The controller 9-50 writes and reads data to and from the storage unit 9-40. For this purpose, the controller 9-50 may include at least one processor.

Embodiment 1-2

Figure 10:
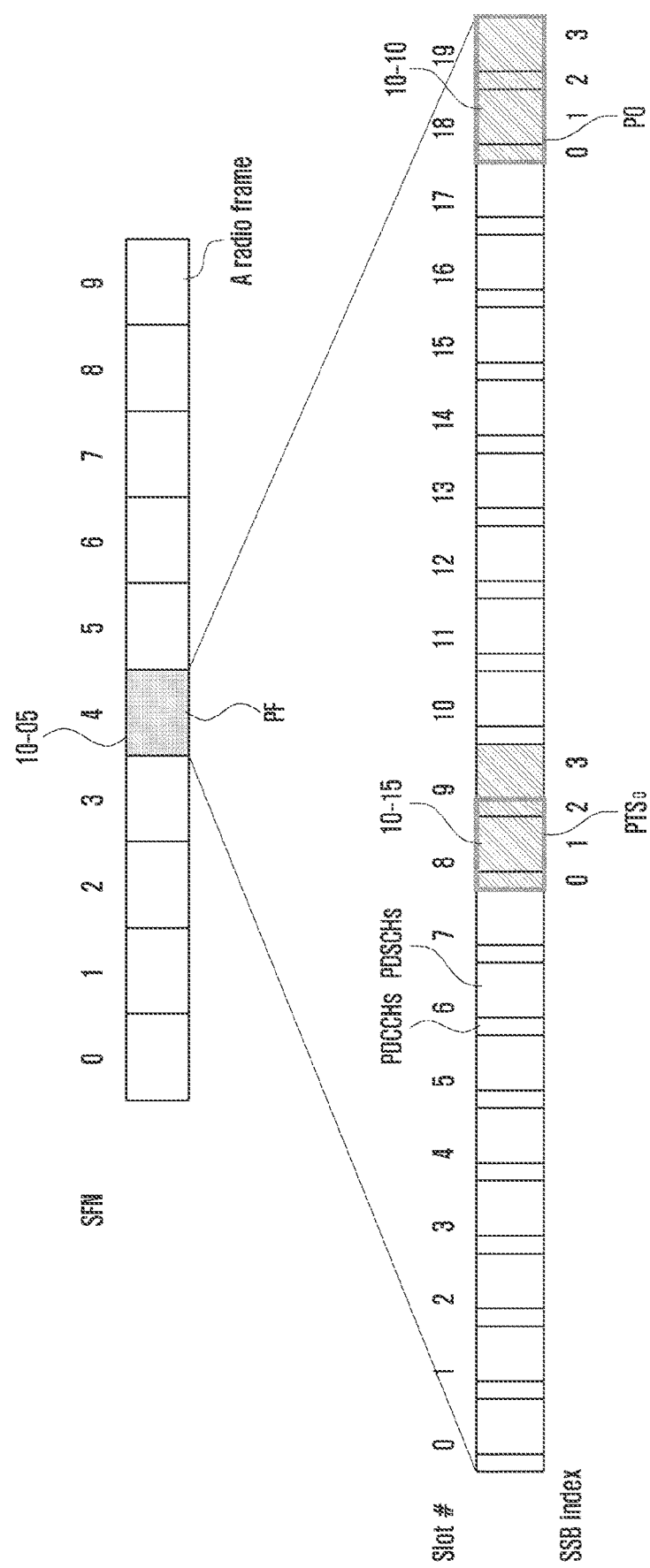
FIG. 10 is a diagram illustrating an operation of paging a UE using multiple time slots in a radio frame according to an embodiment of the disclosure.

FIG. 10 is a diagram illustrating an operation of paging a UE using multiple time slots in a radio frame according to an embodiment of the disclosure. As described above, multiple time slots are required for transmitting a paging signal even in the case of using multi-beam antennas. Unlike the legacy LTE system using a PO consisting of one time slot, the system according to an embodiment of the disclosure is characterized by the existence of multiple time slots in one PO as denoted by reference number 10-10. In this embodiment, each time slot corresponds to multiple beam antennas, and two or more beam antennas transmit the paging signal in one time slot. In this embodiment, a time slot is referred to as paging time slot (PTS) 10-15. In detail, the PTS denotes a time slot for transmitting a paging signal quasi co-located (QCLed) with a synchronization signal/physical broadcast channel block (SSBs) corresponding to multiple beam antennas. The SSB includes a primary synchronization signal (PSS) and a secondary synchronization signal (SSS) for achieving synchronization between a UE and a base station and a physical broadcast channel (PBCH)

for acquiring information broadcast within a cell. The base station may explicitly notify the UE of the multiple time slots constituting a PO. The disclosure proposes a method for indicating the number of PTSs constituting a PO using the highest SSB index and the number of SSBs mapped to one time slot. For example, the number of PTSs constituting a PO may be indicated by (highest SSB index+1/number of SSBs mapped to one time slot). In this embodiment, assuming the subcarrier spacing of 30 kHz and the highest SSB index of 3 and 2 SSBs mapped to one time slot, a PO consists of 2 PTSs as denoted by reference number 10-10. The nth PTS in the PO may be configured as PTSn-1 as denoted, for example by PTS 10-15. Although 2 PTSs are assigned for transmission of a signal paging the UE, it is sufficient for the UE to successfully receive the paging signal in one PTS. If the received signal strength of the paging signal is greater than that of a reference signal in all PTSs, the UE may monitor all of the PTSs or only the PTS(s) corresponding to one or N SSB indices indicating the SSBs with the best received signal strengths for the paging signal. Because the same paging signal is transmitted in the multiple PTSs constituting a PO, it may be possible to perform soft combining on the multiple PTSs to decode the paging message.

The disclosure proposes DRX operations of UEs in the idle state using Equation 5 in the next generation mobile communication system. The SFN increases by 1 for every radio frame. If the paging signal is received in the radio frame satisfying Equation 5, the UE performs the reception operation according to the DRX configuration. This radio frame is referred to as paging frame (PF) 10-05.

(SFN+offset)mod T=(T div N)*(UE_ID mod N)  <Equation 5>

Here,

SFN: System Frame Number. 10 bits (MSB 8 bits explicit, LBS 2 bits implicit)

T: DRX cycle of the UE. Transmitted on SIB2. ENUMERATED {rf32, rf64, rf128, rf256}

N: min(T,nB)

nB: Transmitted on SIB2. ENUMERATED {2T, T, T/2, T/4, T/8, T/16}.

offset: 0, 1, for nB=T/2; 0, 1, . . . , 3 for nB=T/4; 0, 1, . . . , 7 for nB=T/8, 0, 1, . . . , 15 for nB=T/16

UE_ID: IMSI mod 1024 (IMSI is a unique number assigned to a UE)

A master information block (MIB) that is carried by a physical broadcast channel (PBCH) includes an 8-bit SFN. The parameters T and nB are included in system information block type 2 (SIB2) being transmitted by the base station.

As described above, the base station transmits a paging signal QCLed with SSBs to the UE. Here, the paging signal being transmitted from the base station to the UE may be frequency-division-multiplexed (FDMed) or time-division-multiplexed (TDMed) with an SS burst set. Because an SS burst set periodicity may be set to a value selected from {5, 10, 20, 40, 80, 160 ms}, the base station transmits the SS burst set to the UE based on the preset periodicity. As a result, the UE may perform a paging signal reception operation according to SS burst set periodicity. Accordingly, the disclosure proposes a method for configuring the value of nB in association with the SS burst set periodicity. Unlike the legacy LTE system in which the nB value is selected from {4T, T, T/2, T/4, T/8, T/16, T/32, T/64, T/128, T/256}, the next generation mobile communication system is characterized by selecting the nB value from {2T, T, T/2, T/4, T/8, T/16}. The disclosure proposes a method for the base station to transmit a paging signal regardless of whether the SFN of the PF is even or odd. As described above, unlike the legacy LTE in which the base station transmits a paging signal to the UE if the SFN of the PF is always even in the case where NB is less than T, the NR is characterized in that the SFN of the PF may be either even or odd because the base station transmits the paging signal QCLed with SSBs to the UE. For example, if the SS burst set periodicity is 40 ms, the base station may select one of 4 radio frames to transmit the SS burst set to the UE such that the SFN of the radio frame carrying the SS burst set may be either even or odd. If the base station transmits the paging signal QCLed with the SS burst set to the UE, the UE has to perform the paging signal reception based on the SFN of the PF carrying the SS burst set. Accordingly, the disclosure proposes performing the paging signal reception operation based on the paging signal being transmitted in the radio frame satisfying Equation 5 with the introduction of an offset in the case where nB is less than T. The value of T may be selected from {rf32, rf64, rf128, rf256} where rf32 corresponds to 32 radio frames. That is, rf32 indicates 320 ms. The value of T that is actually applied to Equation 5 is derived through coordination among the UE, base station, and MME. The base station provides the UE with a default DRX value via SIB as one of system information blocks it broadcasts. If the UE wants a DRX period shorter than that indicated by the default DRX value, it may transmit a UE-specific DRX value as a desired DRX value to the MME through an ATTACH procedure. If it is necessary to page the UE, the MME transmits to the base station the UE-specific DRX value received from the UE along with a paging message. The UE determines the smallest value between the UE-specific DRX value transmitted to the MME and the default DRX value received from the base station as the DRX period. The base station also determines the smallest value between the UE-specific DRX value received from the MME and the default DRX value it is broadcasting as the DRX period for the UE. The DRX period value is identified with the actual value of T that is applied to Equation 5. Accordingly, the UE and the base station select the same DRX period. The base station determines the PF using Equation 5 based on the DRX period and transmits a paging signal to the UE in the PF.

The UE monitors a PO in the PF derived by Equation 5 for the paging signal destined therefor as denoted by reference number 10-10. The PO is derived by Equation 6.

i_s=floor(UE_ID/N)mod Ns  <Equation 6>

Here, because the value of nB is selected from {2T, T, T/2, T/4, T/8, T/16}, Ns becomes 2 for the case where nB is 2T and 1 for the case where nB is equal to or less than T. Accordingly, Ns may be set to 1 or 2. Because a PO may consist of multiple PTSs as aforementioned, the terminal should know the start point of the PO, i.e., the first PTS within the PO, to perform monitoring efficiently for the paging signal destined therefor. The number of PTSs constituting a PO is identical with the number of slots/symbols of the remaining minimum system information (RMSI) being transmitted from the base station to the UE. The RMSI is system information including partial information of SIB1 and SIB2 as specified in LTE, and the base station broadcasts the RMSI periodically. The disclosure proposes a method for transmitting a paging signal FDMed with the RMSI to a UE. As described above, the base station may transmit the paging signal FDMed or TDMed with SSBs. In the case where the paging signal is FDMed, the UE may derive the first PTS within the PO derived as above from the start time of the RMSI. In the case where the paging signal is TDMed, if the start time of the RMSI is fixed, the UE may derive the first PTS within the PO derived as above from the start time of the RMSI. In the case where the paging signal is TDMed, if the start time of the RMSI changes dynamically, the base station may notify the UE of the start time of the RMSI. Alternatively, if the base station transmits the paging signal to the UE in a slot different from that carrying the RMSI for flexibility, the base station may notify the UE of the first slot carrying the paging signal within the PO. The disclosure proposes a method for a UE to perform monitoring for a paging signal with Table 5.

TABLE 5

| Ns | The first TS of PO when i_s = 0 | The first TS of PO when i_s = 1 |
|---|---|---|
| 1 | The first TS of RMSI if starting slot is not signaled Starting slot if signaled | N/A |
| 2 | The first TS of the first RMSI Starting slot if signaled | The first TS of the second RMSI Starting slot if signaled |

The procedure for paging a UE using multiple time slots is performed in a similar manner to that of embodiment 1-1 depicted in the flowchart of FIG. 6.

Figure 11:
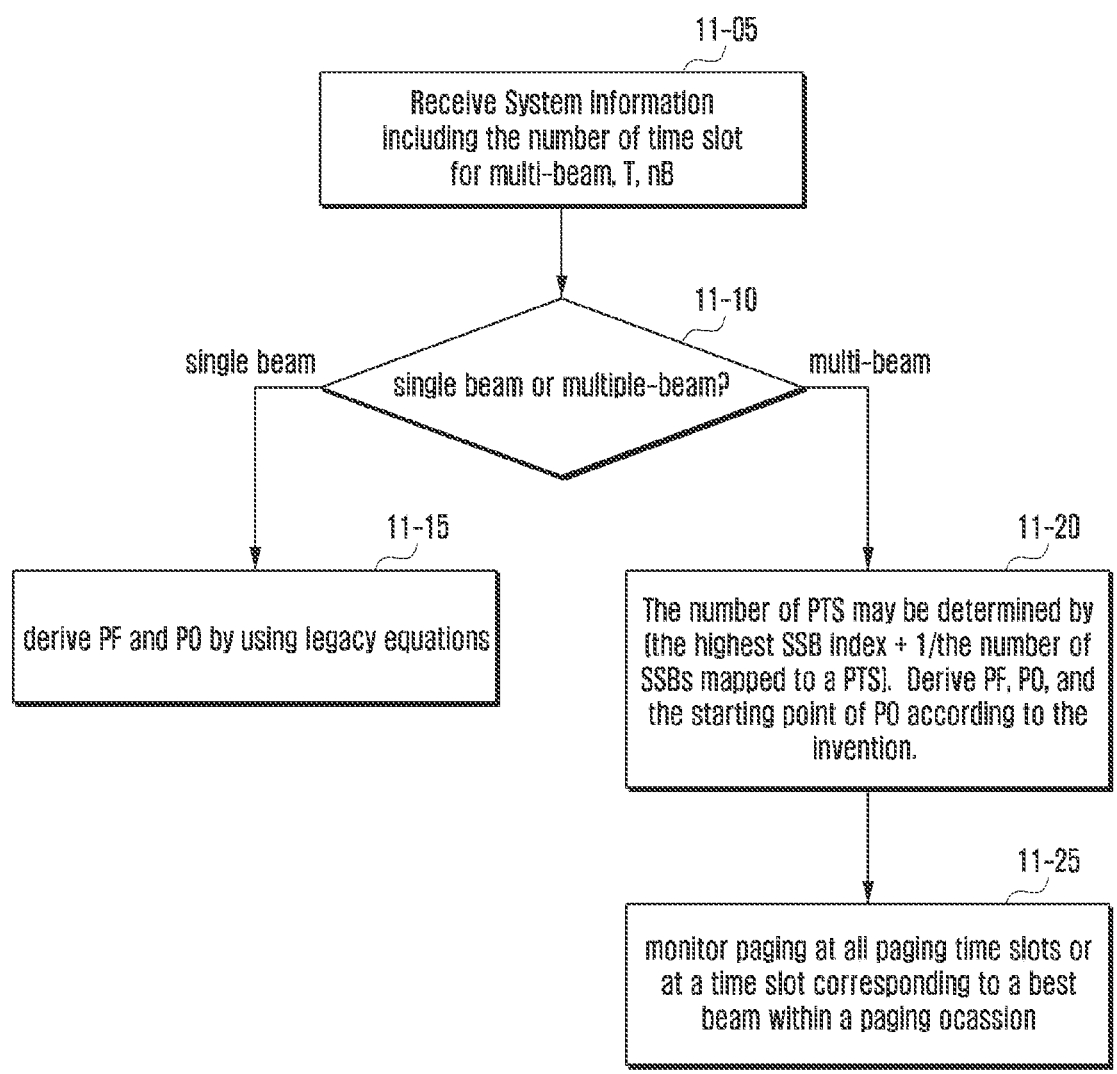
FIG. 11 is a diagram illustrating a UE operation according to an embodiment of the disclosure.

FIG. 11 is a diagram illustrating a UE operation according to an embodiment of the disclosure.

The UE receives system information from a base station at step 11-05, the system information including a number of time slots corresponding to multi-beam antennas and values of T and nB as paging-related configuration information. At step 11-10, the UE determines to receive a paging signal from multi-beam antennas for the case where the system information includes time slot information and from a single beam antenna for the case where the system information does not include the time slot information. Furthermore, at step 11-10, the UE may monitor an SSB for the number of beam antennas to determine to receive a paging signal from multi-beam antennas for the case where the number of beam antennas is equal to or greater than 2 and from a single beam antenna for the case where the number of beam antennas is less than 2. If the UE determines to receive a paging signal from a single beam antenna, it derives a PF and a PO, at step 11-15, by using the legacy LTE paging formula. If the UE determines to receive a paging signal from multi-beam antennas, it may derive the number of PTSs constituting a PO, at step 11-20, through a formula of highest SSB index+ 1/number of SSBs mapped to one PTS. After deriving the PF and PO through the paging formula proposed in the disclosure at step 10-20, the UE derives the first PTS in the PO. At step 11-25, the UE monitors the time slots corresponding to one or N best beams for a paging signal.

The base station operation is performed in a similar manner to that of embodiment 1-1 (FIG. 7).

The UE has the same configuration as that of embodiment 1-1 (FIG. 8).

The base station of the wireless communication system has the same configuration as that of embodiment 1-1 (FIG. 9).

As described above, the disclosure is advantageous in terms of facilitating transmission and reception of a paging message in a next generation mobile communication system.

The embodiments disclosed in the specification and drawings are proposed to help explain and understand the disclosure rather than to limit the scope of the disclosure. It is obvious to those skilled in the art that various modifications and changes can be made thereto without departing from the broader spirit and scope of the invention. Additionally, the individual embodiments may be combined to form further embodiments. For example, parts of the embodiments of the disclosure may be combined to implement operations of the base station and UE.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   identifying a paging frame including one or more paging occasions, based on an offset associated with the paging frame, a system frame number, and a discontinuous reception (DRX) cycle of the terminal;
   identifying an index for a paging occasion to be monitored based on a number of the one or more paging occasions included in the paging frame; and
   monitoring the paging occasion based on the index for the paging occasion,
   wherein the paging occasion includes multiple time slots, and a number of the multiple time slots is identified based on a subcarrier spacing, and
   wherein the paging frame is further identified based on:

$$(SFN+Offset) \bmod T = (T \operatorname{div} N)*(UE\_ID \bmod N),$$

where SFN is the system frame number, Offset is the offset associated with the paging frame, T is the DRX cycle of the terminal, N is a number of total paging frames in the T, and UE_ID is a mobile subscriber identity mod 1024.

2. The method of claim 1, wherein, in case that the number of the one or more paging occasions is 2, a first paging occasion is included in a first half frame of the paging frame and a second paging occasion is included in a second half frame of the paging frame.

3. The method of claim 1, further comprising:
   receiving, from a base station, information for a starting monitoring occasion of the paging occasion,
   wherein the monitoring starts from a monitoring occasion identified based on the information for the starting monitoring occasion.

4. The method of claim 3, wherein, in case that the information for the starting monitoring occasion is not received, the monitoring starts from a first monitoring occasion of the paging occasion.

5. The method of claim 1, wherein information for the T is received from a base station.

6. The method of claim 1, wherein the index for the paging occasion is further identified based on:

$$i\_s = \operatorname{floor}(UE\_ID/N) \bmod Ns,$$

where i_s is the index, and Ns is the number of the one or more paging occasions included in the paging frame.

7. A method performed by a base station in a wireless communication system, the method comprising:
- identifying a paging frame including one or more paging occasions, based on an offset associated with the paging frame, a system frame number, and a discontinuous reception (DRX) cycle of a terminal;
- identifying an index for a paging occasion to transmit a paging message based on a number of the one or more paging occasions included in the paging frame; and
- transmitting, to the terminal, the paging message in the paging occasion based on the index for the paging occasion,
- wherein the paging occasion includes multiple time slots, and a number of the multiple time slots is identified based on a subcarrier spacing, and
- wherein the paging frame is further identified based on:

$$(SFN+Offset) \bmod T = (T \text{ div } N)*(UE\_ID \bmod N),$$

where SFN is the system frame number, Offset is the offset associated with the paging frame, T is the DRX cycle of the terminal, N is a number of total paging frames in the T, and UE_ID is a mobile subscriber identity mod 1024.

8. The method of claim 7, wherein, in case that the number of the one or more paging occasions is 2, a first paging occasion is included in a first half frame of the paging frame and a second paging occasion is included in a second half frame of the paging frame.

9. The method of claim 7, further comprising:
- transmitting, to the terminal, information for a starting monitoring occasion of the paging occasion,
- wherein the paging occasion is monitored for the paging message starting from a monitoring occasion identified based on the information for the starting monitoring occasion.

10. The method of claim 9, wherein, in case that the information for the starting monitoring occasion is not transmitted, the paging occasion is monitored for the paging message starting from a first monitoring occasion of the paging occasion.

11. The method of claim 7, wherein information for the T is transmitted to the terminal.

12. The method of claim 7, wherein the index for the paging occasion is further identified based on:

$$i\_s = \text{floor}(UE\_ID/N) \bmod Ns,$$

where i_s is the index, and Ns is the number of the one or more paging occasions included in the paging frame.

13. A terminal in a wireless communication system, the terminal comprising:
- a transceiver; and
- a controller configured to:
  - identify a paging frame including one or more paging occasions, based on an offset associated with the paging frame, a system frame number, and a discontinuous reception (DRX) cycle of the terminal,
  - identify an index for a paging occasion to be monitored based on a number of the one or more paging occasions included in the paging frame, and
  - monitor the paging occasion based on the index for the paging occasion,
- wherein the paging occasion includes multiple time slots, and a number of the multiple time slots is identified based on a subcarrier spacing, and
- wherein the paging frame is further identified based on:

$$(SFN+Offset) \bmod T = (T \text{ div } N)*(UE\_ID \bmod N),$$

where SFN is the system frame number, Offset is the offset associated with the paging frame, T is the DRX cycle of the terminal, N is a number of total paging frames in the T, and UE_ID is a mobile subscriber identity mod 1024.

14. The terminal of claim 13, wherein, in case that the number of the one or more paging occasions is 2, a first paging occasion is included in a first half frame of the paging frame and a second paging occasion is included in a second half frame of the paging frame.

15. The terminal of claim 13, wherein the controller is further configured to:
- receive, from a base station, information for a starting monitoring occasion of the paging occasion, and
- wherein the monitoring starts from a monitoring occasion identified based on the information for the starting monitoring occasion.

16. The terminal of claim 15, wherein, in case that the information for the starting monitoring occasion is not received, the monitoring starts from a first monitoring occasion of the paging occasion.

17. The terminal of claim 13, wherein information for the T is received from a base station.

18. The terminal of claim 13, wherein the index for the paging occasion is further identified based on:

$$i\_s = \text{floor}(UE\_ID/N) \bmod Ns,$$

where i_s is the index, and Ns is the number of the one or more paging occasions included in the paging frame.

19. A base station in a wireless communication system, the base station comprising:
- a transceiver; and
- a controller configured to:
  - identify a paging frame including one or more paging occasions, based on an offset associated with the paging frame, a system frame number, and a discontinuous reception (DRX) cycle of a terminal,
  - identify an index for a paging occasion to transmit a paging message based on a number of the one or more paging occasions included in the paging frame, and
  - transmit, to the terminal via the transceiver, the paging message in the paging occasion based on the index for the paging occasion,
- wherein the paging occasion includes multiple time slots, and a number of the multiple time slots is identified based on a subcarrier spacing, and
- wherein the paging frame is further identified based on:

$$(SFN+Offset) \bmod T = (T \text{ div } N)*(UE\_ID \bmod N),$$

where SFN is the system frame number, Offset is the offset associated with the paging frame, T is the DRX cycle of the terminal, N is a number of total paging frames in the T, and UE_ID is a mobile subscriber identity mod 1024.

20. The base station of claim 19, wherein, in case that the number of the one or more paging occasions is 2, a first paging occasion is included in a first half frame of the paging frame and a second paging occasion is included in a second half frame of the paging frame.

21. The base station of claim 19, wherein the controller is further configured to:
- transmit, to the terminal, information for a starting monitoring occasion of the paging occasion, and
- wherein the paging occasion is monitored for the paging message starting from a monitoring occasion identified based on the information for the starting monitoring occasion.

22. The base station of claim 21, wherein, in case that the information for the starting monitoring occasion is not transmitted, the paging occasion is monitored for the paging message starting from a first monitoring occasion of the paging occasion.

23. The base station of claim 19, wherein information for the T is transmitted to the terminal.

24. The base station of claim 19, wherein the index for the paging occasion is further identified based on:

$$i\_s = \text{floor}(UE\_ID/N) \bmod Ns,$$

where i_s is the index, and Ns is the number of the one or more paging occasions included in the paging frame.

* * * * *